United States Patent [19]

Denis et al.

[11] 4,036,771

[45] July 19, 1977

[54] LUBRICATING BASES FOR MULTIGRADE OILS

[75] Inventors: Jacques Denis, Ville d'Avray; Guy Parc, Rueil Malmaison, both of France

[73] Assignee: Institut Francais du Petrole, Rueil-Malmaison, France

[21] Appl. No.: 610,769

[22] Filed: Sept. 5, 1975

[30] Foreign Application Priority Data

Apr. 16, 1975 France .................................. 75.12053

[51] Int. Cl.$^2$ .............................................. C10M 1/24
[52] U.S. Cl. ................................ 252/56 R; 252/56 S; 252/57
[58] Field of Search ...................... 252/56 R, 56 S, 57

[56] References Cited

U.S. PATENT DOCUMENTS

| | | | |
|---|---|---|---|
| 3,773,668 | 11/1973 | Denis et al. | 252/56 R |
| 3,843,535 | 10/1974 | Denis et al. | 252/56 R X |
| 3,871,837 | 3/1975 | Bedague et al. | 252/56 R X |
| 3,912,640 | 10/1975 | Anzenberger | 252/56 R X |
| 3,912,642 | 10/1975 | Sturwold et al. | 252/56 S X |

*Primary Examiner*—Delbert E. Gantz
*Assistant Examiner*—AndreW H. Metz

*Attorney, Agent, or Firm*—Millen & White

[57] ABSTRACT

There are disclosed lubricating compositions consisting of homogeneous mixtures of:

a. from 50 to 99% by weight of at least one mineral or synthetic hydrocarbon oil of lubricating viscosity,
b. from 1 to 50% by weight of at least one complex ester composition formed as between at least one polycarboxylic acid selected from dimeric and trimeric unsaturated fatty acids, optionally hydrogenated, at least one dihydroxyl compound selected from polyalkylene glycols and diols, and at least one monofunctional compound comprising at least one monocarboxylic acid or at least one monohydroxyl compound selected from monohydric alcohols or monohydric phenols and oxyalkylenated monohydric alcohols or monohydric phenols, with the condition that one at least of the mono- or dihydroxyl compounds comprises a compound with oxyalkylene groups, and
c. from 0 to 40% by weight of at least one light ester.

These compositions are usable as bases for multigrade oils with the addition of low amounts of viscosity index improvers, or without any addition of such additives.

52 Claims, No Drawings

LUBRICATING BASES FOR MULTIGRADE OILS

The invention concerns novel lubricating bases for multigrade oils.

The formulation of multigrade oils from hydrocarbon oils of mineral or synthetic origin generally requires the addition of relatively large amounts of additives which are intended to improve their viscosity index, although they suffer generally from the disadvantage of unsatisfactory heat stability and mechanical stability, under the severe temperature and loading conditions to which oils may be subjected. Thus, in order to reduce the amounts of viscosity number improving additives, it has already been proposed that hydrocarbon bases might be used, in mixture with various synthetic oils comprising for example esters of diacids, esters of polyols, esters of polyalkylene glycols, esters of ethers of condensation of alkylene oxide or mono- or polyhydroxyl compounds.

It has now been found that some compositions of the complex ester type could advantageously be used as components of lubricating bases for multigrade oils, in mixture with mineral or synthetic hydrocarbon oils.

The invention provides novel lubricating bases for multigrade oils, which essentially comprise homogenous mixtures a. of a proportion of from 50 to 99% by weight of at least one mineral or synthetic hydrocarbon oil of lubricating viscosity, b. a proportion of from 1 to 50% by weight of at least one complex ester composition, and c. a proportion of from 0 to 40% by weight of at least one light ester, to which there is added the amount of viscosity number improving additive that is just necessary to attain the viscosimetric characteristics corresponding to the desired SAE category, said lubricating bases being characterised in that said complex ester composition is formed as between at least one polycarboxylic acid selected from dimeric and trimeric unsaturated fatty acids, which may be hydrogenated, at least one dihydroxyl compound selected from polyalkylene glycols and diols, and at least one monofunctional compound comprising at least one monocarboxylic acid or at least one monohydroxyl compound selected from monohydric alcohols (or monohydric phenols) and oxyalkylenated monohydric alcohols (or monohydric phenols), with the condition that one at least of the mono- and dihydroxyl compounds comprises a compound having oxyalkylene groups.

The complex ester compositions of the invention can firstly result (a) from the esterification of a dimeric unsaturated fatty acid with at least one dihydroxyl compound comprising at least one polyalkylene glycol or at least one ordinary diol and with at least one monohydroxyl compound comprising at least one oxyalkylenated monohydric alcohol (or monohydric phenol) and/or at least one ordinary monohydric alcohol (or monohydric phenol), with the condition that one at least of the mono- and dihydroxyl compounds contains oxyalkylene groups, the various reactants being used in proportions which substantially correspond to 2 moles of dimeric acid for 1 mole of dihydroxyl compound and 2 moles of monohydroxyl compound.

The compositions can also result (b) from esterification of such a dimeric acid and at least one monocarboxylic acid with at least one dihydroxyl compound comprising at least one polyalkylene glycol (preferably a polypropylene glycol), the various reactants being employed in this case in proportions which substantially correspond to 1 mole of dimeric acid and 2 moles of monocarboxylic acid for 2 moles of polyalkylene glycol.

The compositions of the invention can also result (c) from esterification of a trimeric unsaturated fatty acid with, as above in (a), for the dimeric acid, at least one dihydroxyl compound (ordinary diol or polyalkylene glycol) and at least one monohydroxyl compound (oxyalkylenated monohydric alcohol or monohydric phenol and/or ordinary monohydric alcohol or monohydric phenol), with the condition that one at least of the mono- and dihydroxyl compounds contains oxyalkylene groups, the various reactants being employed in proportions which, in this case, substantially correspond to 2 moles of trimeric acid for 1 mole of dihydroxyl compound and 4 moles of monohydroxyl compound.

The compositions can also result (d) from esterification of such a trimeric acid and, as above in (b) as regards the dimeric acid, at least one monocarboxylic acid with at least one polyalkylene glycol (preferably a polypropylene glycol), the reagents being employed in proportions which, in this case, substantially correspond to 1 mole of trimeric acid and 3 moles of monocarboxylic acid for 3 moles of polyalkylene glycol.

The compositions according to the invention can also result (e) from esterification of mixtures in varying proportions of dimeric acid and trimeric acid with a dihydroxyl compound and a monohydroxyl compound as in (a) or (c) above, the proportions of the various reagents then being such that to 2 moles of acid (dimeric + trimeric) there substantially corresponds 1 mole of dihydroxyl compound and the number of moles of monohydroxyl compound necessary to esterify the remaining carboxylic functions.

Finally, the compositions of the invention can result (f) from esterification of mixtures in varying proportions of dimeric + trimeric acids and monocarboxylic acids by a polyalkylene glycol as in (b) and (d), the proportions of the reagents then being such that to 1 mole of acid (dimeric + trimeric) there substantially corresponds 2 moles of polyalkylene glycol and the number of moles of monocarboxylic acid necessary to esterify the remaining hydroxyl functions.

It is also possible to use in the invention (g) compositions of esters which are defined as in (a) above but in which substantially 3 moles of dimeric acid are used for 2 moles of dihydroxyl compound and 2 moles of monohydroxyl compound. These compositions are included in the present specification in the term "complex ester compositions".

It is also possible to use in accordance with the invention the mixtures of at least two of the compositions of esters as defined in (a) to (g) above.

Of the compositions of esters as defined in (a), (c), (e) and (g) above, there will be considered more particularly those in which the dihydroxyl compound essentially comprises a polyalkylene glycol (preferably a polypropylene glycol). In this case, the monohydroxyl compound advantageously comprises an oxyalkylenated (preferably oxypropylenated) monohydric alcohol or monohydric phenol, or a mixture of oxyalkylenated (preferably oxypropylenated) monohydric alcohol or monohydric phenol and ordinary monohydric alcohol or monohydric phenol.

Moreover, of the compositions of esters as defined in (g) above, those are also of advantage in which the dihydroxyl compound essentially comprises an ordinary diol, the monohydroxyl compound then essentially comprises an oxyalkylenated (preferably oxypropylenated) monohydric alcohol or monohydric phenol.

In order to define in greater detail the complex ester compositions used in accordance with the invention, there now follows a detailed description of the various compounds of which they can be formed.

The dimeric and trimeric acids considered in the present invention are more particularly those which result respectively from the dimerization or trimerization of unsaturated fatty acids which contain from 14 to 22 carbon atoms, while the dimerization or trimerization operation respectively can be followed by a hydrogenation operation. The dimeric acids therefore generally contain from 28 to 44 carbon atoms and the trimeric acids from 42 to 66 carbon atoms.

Examples which can be mentioned of dimeric (or trimeric) acids include those which result from the dimerization (or trimerization respectively) of the following unsaturated fatty acids:
  tetradecenoic acids (such as myristeleic acid)
  hexadecenoic acids (such as palmitoleic acid)
  octadecenoic acids (such as oleic acid), octadecadienoic acids (such as linoleic acid) and octadecatrienoic acids (such as linolenic acid)
  eicosenoic acids
  docosenoic acids (such as erucic acid or brassidic acid)
and natural or synthetic mixtures of a plurality of such acids, for example:
  fatty soya bean acids which contain inter alia about 25% of octadecenoic acid, 45% of octadecadienoic acid and 7% of octadecatrienoic acid,
  fatty linseed oil acids which contain inter alia about 20% of octadecenoic acid 15% of octadecadienoic acid and 50% of octadecatrienoic acid,
  fatty spermaceti oil acids which contain inter alia about 5% of tetradecenoic acid, 15% of hexadecenoic acid, 35% of octadecenoic acid and 1% of octadecadienoic acid
  fatty colza oil acids which contain inter alia about 18% of actadecenoic acid, 19% of octadecadienoic acid, 8% of octadecatrienoic acid, 6% of eicosenoic acid and 42% of docosenoic acid.

Mention can also be made of the di- and tricarboxylic acids resulting from the dimerization or trimerization of hydroxycarboxylic acids such as ricinoleic acid.

The oligomerisation of unsaturated fatty acids such as those mentioned above generally results in complex mixtures mainly comprising trimeric acids, dimeric acids and the monomeric acids which have not reacted. Starting from these mixtures, it is possible, for example by fractionated distillation, to separate the dimeric and the trimeric acids, or mixtures of dimeric and trimeric acids.

The preferred dimeric and trimeric acids of the invention are those which result from the dimerization or trimerization of $C_{18}$ unsaturated fatty acids (for example oleic, linoleic or linolenic acids), used either in a pure state or in natural or synthetic mixtures which contain a substantial proportion thereof.

The polyalkylene glycols which are considered in the present invention correspond to the following general formula:

in which $R_1$ is a 1,2-alkylene radical, preferably 1,2-propylene, and the number $n$ representing the average degree of polycondensation of the polyalkylene glycol is of a value of from 2 to 50 and in most cases from 2 to 30. The polypropylene glycols which are used more particularly in the present invention then have a mean molecular weight of about 130 to 3,000 and in most cases about 130 to 1,800.

The diols involved in the present invention correspond to the general formula $HO - R_1' - OH$, in which $R_1^*$ is a divalent hydrocarbon radical, more particularly a divalent saturated aliphatic radical which contains for example from 2 to 20 carbon atoms. The following can be mentioned as examples of these diols: ethylene glycol, propane-1,3-diol, butane-1,4-diol, neopentylglycol, pentane-1,5-diol, hexane-1,6-diol, 2,2,4-trimethyl pentane-1,3-diol, 2,2,4 and 2,4,4-trimethyl hexane-1,6-diols, and dodecane-1,10-diol. It is also possible to use diols which do not correspond to the above general formula and whose radical may contain an ester function such as neopentyl glycol hydroxypivalate.

The monohydric alcohols and monohydric phenols used in the present invention correspond more particularly to the general formula $R_2 - OH$, in which $R_2$ is a monovalent hydrocarbon radical which can be an aliphatic radical having from 1 to 25 carbon atoms, an alicyclic radical having from 3 to 25 carbon atoms, or an aromatic radical having from 6 to 25 carbon atoms.

The following can be mentioned as examples of aliphatic monohydric alcohols: methanol, ethanol, n-butanol, 2-ethyl hexanol, isononanol, isodecanol, dodecanol, isotridecanol or isopentadecanol;

the following can be mentioned as examples of alicyclic monohydric alcohols: cyclopropanol, cyclobutanol, cyclohexanol or methylcyclohexanol;

and the following can be mentioned as examples of monohydric phenols: phenol itself and phenols having a nucleus substituted by one or more alkyl groups such as dodecylphenol, nonylphenol or heptylphenol.

The oxyalkylenated monohydric alcohols and monohydric phenols involved in the present invention correspond to the general formula $R_2 - O + R_1 - O)_{n'}H$, in which $R_1$ and $R_2$ are as defined above and $n'$ is a number of from 1 to 50, the group $R_1$ being more particularly a 1,2-propylene group and the number $n'$ preferably having a value of from 1 to 30.

The oxypropylenated monohydric alcohols and monohydric phenols thus defined generally have a mean molecular weight of about 90 to 2,800 and more particularly about 90 to 2,100, depending on the nature of the monohydric alcohol or monohydric phenol and depending on the degree of condensation of the propylene oxide. Examples which can be mentioned of such oxypropylenated monohydric alcohols or phenols include those which result from the condensation of propylene oxide on aliphatic or alicyclic monohydric alcohols or on the monohydric phenols mentioned above.

The monocarboxylic acids involved in the present invention correspond to the formula $R_2'$ COOH, in which $R_2'$ is a monovalent hydrocarbon radical, more particularly a monovalent aliphatic radical which contains from 1 to 25 carbon atoms.

The following can be mentioned as examples of monocarboxylic acids: heptanoic acid, 2-ethyl hexanoic acid, pelargonic acid, isononanoic acid, isodecanoic acid, undecenoic acid, dodecanoic acid, isostearic acids, cuts resulting from the fractionated distillation of fatty acids, and natural or synthetic mixtures of a plurality of saturated or unsaturated fatty acids.

The complex ester compositions used in the present invention can be prepared by any conventional esterification process using the carboxyl and hydroxyl reactants as defined above in suitable proportions, bearing in mind that, instead of the carboxylic acids themselves, it is possible to use halides thereof or lower alkyl esters thereof.

The complex esters of the present invention, possibly after purification for example by distillation and/or by passing over activated earth or alumina, occur in the form of viscous liquids having a specific gravity which is generally close to unity. Their viscosity at 98.9° C can vary within very wide limits, for example from 30 to 200 centistokes.

They generally have a high viscosity number, for example from about 150 to about 250.

The lubricating bases according to the invention can comprise binary mixtures of complex ester compositions as defined above, with mineral hydrocarbon oils. Consideration is given more particularly in this case to solvent-refined mineral oils, acid-refined mineral oils and hydro-refined mineral oils which have a viscosity at 37.8° C of from about 100 to 600 SSU.

These lubricating bases can comprise varying proportions of the two components, for example a proportion of from 1 to 40% by weight, preferably from 5 to 20% by weight, of at least one complex ester composition according to the invention, for a proportion of from 60 to 99% by weight and preferably from 80 to 95% of at least one mineral oil. More particularly, these proportions will be so selected that the amount of viscosity additive which may be added to the mixture to achieve the viscosity characteristics corresponding to the desired SAE category is as small as possible.

In order to adjust the viscosimetric characteristics of the lubricating bases comprising mixtures of complex esters according to the invention and mineral oils and, if necessary, to improve the miscibility of the components as amongst themselves, it is provided in accordance with the invention to incorporate into said mixtures one or more light esters, such as:

esters of dicarboxylic acids and monohydric alcohols such as isodecyl adipate, isotridecyl adipate, trimethylhexyl azelate, ethylhexyl sebacate, and octyl and decyl trimethyladipate.

esters of monocarboxylic acids and polyols such as trimethylolpropane pelargonate, neopentylglycol pelargonate, trimethylolpropane heptanoate laurate.

or esters of mono- or dicarboxylic acids and polyoxyalkylenated alcohols having a low degree of condensation, such as the laurates or dodecanedioates of polyoxypropylenated butanols, whose viscosity can vary for example from 5 to 30 cSt at 37.8° C.

or esters of monocarboxylic acids and polyoxyalkylene glycols of low molecular weight, such as polyoxypropylene glycol dilaurate having a weight of 300.

The proportion of these light esters in the lubricating bases can be for example from 10 to 40% by weight. In this case the proportion of mineral oil is for example from 50 to 80% by weight and the proportion of complex ester is for example from 1 to 40% by weight.

The lubricating bases of the invention can also comprise mixtures of complex esters as defined above, with synthetic hydrocarbon oils. In this case the synthetic hydrocarbon oil can comprise for example:

a polymer produced by polymerization of olefins having from 2 to 20 carbon atoms, for example polyisobutenes having a mean molecular weight of 200 to 2,000 and preferably from 300 to 500.

a mono- or polyalkylated aromatic compound, which may be partially or completely hydrogenated, such as didodecylbenzene and didodecylcyclohexane.

In these mixtures, the proportions of the components, depending on the nature and the characteristics of the synthetic hydrocarbon oil used, are for example from 1 to 40% by weight of complex ester according to the invention, for from 60 to 99% by weight of synthetic hydrocarbon oil.

The base oil can also comprise varying proportions of light esters, as indicated above.

In order to produce the final lubricating oils, in particular multigrade oils, there are incorporated in the lubricating bases as defined above, normal proportions of conventional additives, particular:

anti-oxidant additives cf phenolic, amino or organometallic types, such as zinc alkyldithiophosphate, dispersing additives such as derivatives of succinimides, or methacrylic copolymers with nitrogen function, and organo-metallic detergent additives such as sulphonates, phenate-sulphides, salicylates, or phosphonates.

As stated above, one of the advantages of the lubricating bases of the invention is to permit the formulation of multigrade oils with the reduced or zero addition of conventional viscosity additive. Another important advantage is that the presence in the lubricating base of complex esters in accordance with the invention imparts to the base anti-wear properties which are particularly improved in comparison with those of the hydrocarbon oils, which if necessary make it possible to avoid the use of specific anti-wear additives which are liable to suffer from some serious disadvantages: there is the danger in particular that the efficiency of such additives decreases in the course of their working life, because they can be partly consumed, generally by virtue of their insufficient resistance to hydrolysis and their relatively low level of heat stability.

It is therefore important to be able to use in accordance with the invention lubricating bases which are themselves endowed with good anti-wear properties, this making it possible to ensure satisfactory lubrication throughout their working life.

Besides using the lubricating compositions of the invention in the formulation of engine oils, they can also be used in other ways in related areas, in particular in the production of hydraulic fluids or metal-working oils (for example cutting and shaping).

The following examples illustrate the invention, and in no way are to be considered as limitative. Examples 12 and 21 are given by way of comparison.

PREPARATION A

A complex ester is prepared by esterification under usual conditions, of a dimeric acid derived from $C_{18}$ unsaturated fatty acids, by a mixture of polypropylene glycol and polyoxypropylenated alcohols, in proportions of 2 moles of dimeric acid for 1 mole of polypropylene glycol and 2 moles of polyoxypropylenated alcohol.

The dimeric acid used is an industrial dimeric acid of molecular weight 565, a saponification index of 191-198, and 95% purity (EMPOL 1014 produced by UNILEVER-EMERY).

The polypropylene glycol used has a molecular weight of 400 and contains about 7 propylene oxide units per molecule.

The polyoxypropylenated alcohol is produced by condensation of propylene oxide on a mixture of $C_{13}$ to $C_{15}$ saturated aliphatic monohydric alcohols. It has a viscosity at 37.8° C of about 100 cSt and contains about 20 propylene oxide units per molecule.

The characteristics of the complex ester produced are as follows:

| | |
|---|---|
| Viscosity at 37.8° C | 701 cSt |
| Viscosity at 98.9° C | 84 cSt |
| $VI_E$ | 222 |
| Pour point | −30° C |

PREPARATION B

A complex ester is prepared by esterification under usual conditions, of a polypropylene glycol, by means of a mixture of dimeric acid derived from $C_{18}$ unsaturated fatty acids, and lauric acid, in respective proportions of 2 moles of polypropylene glycol for 1 mole of dimeric acid and 2 moles of lauric acid.

The dimeric acid and the polypropylene glycol used are the same as in preparation A above.

The characteristics of the resulting complex ester are as follows:

| | |
|---|---|
| Viscosity at 37.8° C | 308 cSt |
| Viscosity at 98.9° C | 39 cSt |
| $VI_E$ | 188 |
| Pour point | −36° C |

PREPARATIONS C, D AND E

Three complex esters are prepared by esterification, under usual conditions, of trimeric acid derived from $C_{18}$ unsaturated fatty acids, by means of mixtures of polypropylene glycols and polyoxypropylenated alcohols, in proportions of 2 moles of trimeric acid for 1 mole of polypropylene glycol and 4 moles of polyoxypropylenated alcohols.

The trimeric acid used is an industrial trimeric acid having a molecular weight of 850, a saponification index of 192-200 and 95% purity (EMPOL 1040 produced by UNILEVER-EMERY).

The polypropylene glycols used have respectively molecular weights of 134, 400 and 1200; they contain about 2, 7 and 20 polypropylene oxide units per molecule respectively. The polyoxypropylenated alcohol is produced by the condensation of propylene oxide on a mixture of $C_{13}$ to $C_{15}$ saturated aliphatic monohydric alcohols. It has a viscosity at 37.8° C of about 100 cSt, and contains about 20 propylene oxide units per molecule.

The characteristics of the resulting complex esters are given in table I below.

TABLE I

| | | Viscosities (cSt) | | | Pour |
| Prep. | Complex ester based on | at 37.8° C | at 98.9° C | $VI_E$ | point (° C) |
|---|---|---|---|---|---|
| C | Polypropylene glycol 134 | 930 | 112.4 | 231 | −27 |
| D | Polypropylene glycol 400 | 894 | 110.6 | 231 | −24 |
| E | Polypropylene glycol 1200 | 1160 | 142.5 | 243 | −24 |

PREPARATION F, G and H

Three complex esters are prepared by the esterification, under usual conditions, of polypropylene glycols, by means of mixtures of trimeric acid derived from $C_{18}$ unsaturated fatty acids, and lauric acid, in respective proportions of 3 moles of polypropylene glycol for 1 mole of trimeric acid, and 3 moles of lauric acid.

The trimeric acid and the polypropylene glycols used are respectively the same as in preparations C to E above.

The characteristics of the resulting esters are given in table II below.

TABLE II

| | | Viscosities (cSt) | | | Pour |
| Prep. | Complex ester based on | at 37.8° C | at 98.9° C | $VI_E$ | point (° C) |
|---|---|---|---|---|---|
| F | Polypropylene glycol 134 | 525 | 54.5 | 178 | −24 |
| G | Polypropylene glycol 400 | 604 | 69.5 | 200 | −27 |
| H | Polypropylene glycol 1200 | 736 | 93.6 | 227 | −27 |

EXAMPLES 1 to 11

A 280 neutral mineral oil is used to prepare multigrade oils falling in the SAE 20 W 40 category, by the addition of complex esters A - H.

The mineral oil and each of the complex esters A - H is mixed in the proportions indicated in table III below, and a light ester is also added, also in the specified proportions. The specified amount of viscosity additive (commercial polymethacrylate), 2% by weight of antioxidizing additive and 5% by weight of detergent additive are also added to each of the mixtures.

The characteristics of the resulting oils are given in table III below.

TABLE III

| | Base constituents | | | | | Viscosity additive (% wt) | Viscosity | | | Cloud point (° C) | Pour point (° C) |
| | Mineral oil | | Complex ester | | Light ester | | | at 98.9° C (cSt) | at −17.8° C (cSt) | $VI_E$ | | |
| Oil No. | Nature (2) | % by wt | Nature | % by wt | Nature (1) | % by wt | | | | | | |
|---|---|---|---|---|---|---|---|---|---|---|---|---|
| 1 | 280 N | 57 | A | 13 | TMP-$C_9$ | 30 | 3.5 | 14.34 | 39 | 159 | −12 | −33 |
| 2 | 280 N | 60 | A | 12 | DA.01.10-$C_{12}$ | 18 | 3.5 | 14.2 | 38.5 | 158 | −14 | −33 |
| 3 | 280 N | 65 | B | 15 | A 10 | 20 | 3 | 12.8 | 39 | 150 | −12 | −36 |
| 4 | 280 N | 70 | C | 15 | A 10 | 15 | 2 | 15.2 | 57 | 146 | −16 | −33 |
| 5 | 280 N | 70 | D | 15 | A 10 | 15 | 2 | 15.1 | 55.5 | 147 | −14 | −36 |
| 6 | 280 N | 70 | E | 15 | A 10 | 15 | 2 | 15.7 | 55.5 | 150 | −15 | −30 |
| 7 | 280 N | 70 | F | 15 | A 10 | 15 | 2 | 13.18 | 49.5 | 142 | −14 | −33 |
| 8 | 280 N | 70 | G | 15 | A 10 | 15 | 2 | 13.58 | 49 | 145 | −18 | −36 |
| 9 | 280 N | 56 | G | 13 | TMP-$C_9$ | 31 | 3.5 | 14.26 | 40 | 157 | −15 | −36 |
| 10 | 280 N | 70 | H | 15 | A 10 | 15 | 2 | 14.4 | 51.5 | 147 | −13 | −30 |

TABLE III-continued

| Oil No. | Base constituents | | | | | | Viscosity additive (% wt) | Viscosity at 98.9° C (cSt) | Viscosity at −17.8° C (cSt) | $VI_E$ | Cloud point (° C) | Pour point (° C) |
|---|---|---|---|---|---|---|---|---|---|---|---|---|
| | Mineral oil | | Complex ester | | Light ester | | | | | | | |
| | Nature (2) | % by wt | Nature | % by wt | Nature (1) | % by wt | | | | | | |
| 11 | 280 N | 70 | G | 13 | DA.01.10-$C_{12}$ | 17 | 3.5 | 14.30 | 40 | 157 | −13 | −33 |

(1) A 10 = isodecyl adipate
TMP-$C_9$ = trimethylolpropane pelargonate
DA.01.10-$C_{12}$ = polyoxypropylenated butanol laurate with about 5 units of propylene oxide.
(2) 280 neutral mineral oil is a 50:50 mixture of 200 N and 350 N.

From the above table III, it can be seen that the presence of complex ester in the multigrade oils 1 to 11 makes it possible to use very small proportions of viscosity additive.

Several of these multigrade oil bases were tested on friction machines: a 4-ball machine, an Amsler machine and a FZG machine. A 200 SSU mineral oil to which the same viscosimetric characteristics have been imparted by means of viscosity additive is also tested, by way of comparison (table IV).

The tests carried out on 4-ball machines make it possible to determine the load capacity expressed in terms of the load-wear index (ASTM D 2783-71), and the wear diameters under load (tests of 1 hour).

The load-wear indices and results of wear under load are improved with respect to the reference formulation.

The scuffing simulation tests (chromium-plated ring and cast liner) are carried out on a Amsler disc machine, in stages, with loads increasing at each stage by 10 daN, at a sliding speed of 4 m/sec, the oil being at a temperature of 100° C. Some oil formulations enjoy excellent anti-scuffing properties with respect to the commercial mineral oils, and much lower friction co-efficients.

On a FZG gear machine, there is an improvement of from 2 to 3 "damage stages" with respect to the mineral oil.

The oils of the present invention therefore have a substantially improved performance on friction and wear machines, relative to the mineral base.

phatic monohydric alcohols (registered mark ACROPOL 91).

The dimeric acid and the polypropylene glycol used are the same as in preparation A above.

The characteristics of the complex ester produced are as follows:

| Viscosity at 37.8° C | 691 cSt |
|---|---|
| Viscosity at 98.9° C | 80 cSt |
| $VI_E$ | 207 |
| Pour point | −27° C |

PREPARATION K

Under usual esterification conditions, an ester composition is prepared by reacting 3 moles $C_{18}$ unsaturated fatty dimeric acid with 2 moles of neopentylglycol, then with 2 moles of the polyoxypropylenated monohydric alcohol as set out in preparation A.

The dimeric acid used is the same as in preparation A above.

The characteristics of the resulting ester composition are as follows:

| Viscosity at 37.8° C | 1398 cSt |
|---|---|
| Viscosity at 98.9° C | 148 cSt |
| $VI_E$ | 227 |
| Pour Point | −21° C |

TABLE IV

Tests on the oils on friction machines

| Oil No. | 4 BALLS | | | | | | AMSLER | | | FZG | |
|---|---|---|---|---|---|---|---|---|---|---|---|
| | L-W-T Kgf | Load before seizure Kgf | Welding load Kgf | Mean wear diameter in mm (1 hour) | | | Scuffing load daN | Friction coefficient | Temp. of commencement of seizure (° C) | Damage stage or level | Specific wear (mg/ch.h) |
| | | | | 30 K | 50 K | 70 K | | | | | |
| 1 20 W 40 | 34.7 | 80 | 200 | 0.75 | 0.86 | 1.80 | > 200 | 0.036 | > 240 | 9 | 0.340 |
| 2 20 W 40 | 34.5 | 63 | 200 | 0.67 | 0.73 | 1.75 | 140 | 0.045 | 238 | 10 | 0.186 |
| 9 20 W 40 | 24.8 | 50 | 200 | 0.68 | 0.76 | 1.80 | 160 | 0.043 | 236 | 10 | 0.330 |
| 11 20 W 40 | 29.9 | 63 | 200 | 0.65 | 0.70 | 1.95 | 140 | 0.042 | 228 | 9 | 0.149 |
| 12* 20 W 40 | 22.4 | 50 | 160 | 0.72 | 1.68 | 2.08 | 70 | 0.087 | 219 | 7 | 0.208 |

*Oil 12: 200 Neutral + anti-oxidising-detergent additives + 6.5% viscosity additive (reference)

PREPARATION J

Under usual esterification conditions, a complex ester is prepared by reacting 2 moles of dimeric acid derived from $C_{18}$ unsaturated fatty acids, with 1 mole of polypropylene glycol, then with a mixture of:

1 mole of the polyoxypropylenated alcohol described in Preparation A above, and 1 mole of an ordinarily monohydric alcohol comprising a mixture of $C_9$ to $C_{11}$ branched saturated ali-

EXAMPLES 13 to 17

Multigrade oils falling in the SAE 20W40 category are prepared by the addition of ester compositions J and K to various mineral and synthetic hydrocarbon oils. The mineral oils are 200, 280 and 300 Neutral oils, and the synthetic hydrocarbon oil (referred to as "alkylat") comprises an alkylbenzene in which the alkyl substituent primarily comprises at least one dodecyl radical and which has:

| | |
|---|---|
| a viscosity at 37.8° C | of 27.8 cSt |
| a viscosity at 98.9° C | of 4.6 cSt |
| and a $VI_E$ | of 80 |

The hydrocarbon oils and the ester compositions J and K are mixed in the proportions set out in table V below. Added to some of these mixtures is a light ester, in the specified proportions. The specified amount of polymethacrylate, 2% by weight of anti-oxidizing additive and 5% by weight of detergent additive are also added.

The characteristics of the resulting oils are also given in table V.

EXAMPLES 18 to 20

Multigrade oils falling in the SAE 10 W 30 category are prepared by the addition of ester compositions A, J and K, starting from mineral oils comprising varying proportions of a 100 Neutral oil and a 150 Neutral oil.

The mineral oil and each of the ester compositions is mixed in the proportions set out in table V below, without adding any light ester. The specified amount of polymethacrylate, 2% by weight of antioxidizing additive and 5% by weight of detergent additive are also added.

The characteristics of the oils produced are also given in table V.

It will be seen from table V that the presence of complex ester in the oils 13 to 20 makes it possible to obtain multigrade oils with the addition of very small proportions of viscosity number improving additive (polymethacrylate).

Some of these multigrade oils were tested on friction machines, namely 4-ball and FZG machines. By way of comparison, tests were also carried out on a 150 Neutral oil to which there had been imparted similar viscosity characteristics, by the addition of polymethacrylate.

The results are given in table VI:
- on the "4 ball" machine, the load-wear indices and the wear results are substantially improved with respect to those obtained with the reference oil.
- on the FZG gear machine, an improvement of 2 "damage stages" is obtained with respect to the reference oil.

TABLE VI

| | | 4 balls | | | | | FZG | |
|---|---|---|---|---|---|---|---|---|
| Oil No. | L-W-I Kgf | Load before seizure Kgf | Welding load Kgf | Mean wear diameter in mm (1 hour) | | | Damage stages | Specific wear mg/ch.h |
| | | | | 30 K | 50 K | 70 K | | |
| 18 10 W 30 | 29.2 | 63 | 200 | 0.77 | 0.89 | 1.70 | 9 | 0.175 |
| 19 10 W 30 | 28.4 | 50 | 200 | 0.74 | 0.84 | 2.05 | 9 | 0.192 |
| 20 10 W 30 | 29.7 | 63 | 200 | 0.71 | 0.76 | 2.00 | 9 | 0.122 |
| 21* 10 W 30 | 19.2 | 40 | 160 | 0.81 | 1.67 | 2.13 | 7 | 0.175 |

*Oil 21 (reference) = { 150 Neutral + viscosity additive (3% by weight) + anti-oxidising additive (2% by weight) + detergent additive (5% by weight)

What we claim is:
1. In a lubricating composition usable as multigrade oil for motor-car engines, and comprising a major proportion of base oil of lubricating viscosity and, in amounts sufficient to effect each additives' attendant function, an additive selected from the group consisting of viscosity index improvers, antioxidants, detergents and mixtures thereof, the improvement which comprises utilizing as the base oil a homogeneous mixture comprising:
   a. from 50 to 99% by weight of at least one mineral or synthetic hydrocarbon oil of lubricating viscosity,
   b. from 1 to 50% by weight of at least one complex ester composition produced by the esterification of a dimeric acid derived from at least one unsaturated fatty acid which contains from 14 to 22 carbon atoms, with at least one dihydroxyl compound selected from polyalkylene glycols having the general formula $H + O - R_1)_n OH$, in which $R_1$ is a 1,2-alkylene radical and $n$ is a number of from 2 to 50, and diols having the general formula $HO - R_1' - OH$, in which $R_1'$ is a divalent hydrocarbon radical, and with at least one hydrocarbyl monohy-

TABLE V

| | Base constituent | | | | | | Polyme- thacrylate % wt | Viscosity | | | Cloud Point (° C) | Pour Point (° C) |
|---|---|---|---|---|---|---|---|---|---|---|---|---|
| Oil No. | Hydrocarbon oil | | Complex ester | | Light ester | | | at 98.9° C (cSt) | at −17.8° C (Poises) | $VI_E$ | | |
| | Nature | % wt | Nature | % wt | Nature (1) | % wt | | | | | | |
| | (2) | | | | | | | | | | | |
| 13 | 280 N | 70 | J | 15 | ODTMA | 15 | 2 | 15.0 | 49.5 | 147 | −16 | −36 |
| 14 | 300 N | 91 | J | 9 | — | — | — | 13.2 | 85.0 | 120 | −14 | −33 |
| 15 | 280 N | 75 | K | 10 | ODTMA | 15 | 2 | 13.15 | 46.5 | 140 | −16 | −33 |
| 16 | 200 N | 90 | K | 10 | — | — | 3 | 15.4 | 62.5 | 140 | −12 | −30 |
| 17 | Alkylat | 85 | K | 15 | — | — | 3 | 14.1 | 38.0 | 155 | −13 | −30 |
| 18 | 140 N | 92 | A | 8 | — | — | 2 | 10.2 | 24 | 150 | −12 | −33 |
| 19 | 120 N | 83 | J | 17 | — | — | — | 9.83 | 24.0 | 147 | −14 | −36 |
| 20 | 120 N | 86 | K | 14 | — | — | — | 9.87 | 23.5 | 148 | −12 | −27 |

(1) O D T M A : octyl and decyl trimethyladipate
(2) 280 Neutral mineral oil = 50/50 mixture of 200 N and 350 N
    300 Neutral mineral oil = 30/70 mixture of 200 N and 350 N
    140 Neutral mineral oil = 20/80 mixture of 100 N and 150 N
    120 Neutral mineral oil = 50/50 mixture of 100 N and 150 N droxyl compound selected from monohydric hydrocarbyl alcohols, monohydric phenols of the formula R$_2$–OH, oxyalkylenated monohydric hydrocarbyl alcohols, and oxyalkylenated monohydric phenols of the formula R$_2$—O(R$_1$—O)$_n$H, wherein R$_2$ is an aliphatic, alicyclic or aromatic monovalent hydrocarbyl radical, and $n'$ is a number of from 1 to 50, the reagents being employed in proportions which substantially correspond to 2 moles of dimeric acid for 1 mole of dihydroxyl compound and 2 moles of monohydroxyl compound, and c. from 0 to 40% by weight of at least one light ester selected from esters of monohydric hydrocarbyl alcohols and hydrocarbyl dicarboxylic acids, esters of polyols and hydrocarbyl monocarboxylic acids, esters of polyoxyalkylenated hydrocarbyl monohydric alcohols of a low degree of condensation and hydrocarbyl monocarboxylic acids, esters of polyoxyalkylenated hydrocarbyl monohydric alcohols of a low degree of condensation and hydrocarbyl dicarboxylic acids, and esters of polyoxalkylene glycols of low molecular weight and hydrocarbyl monocarboxylic acids.

2. A composition according to claim 1, wherein the dihydroxyl compound consists essentially of at least one polypropylene glycol having 2–30 oxypropylene groups and the monohydroxyl compound comprises at least one oxypropylenated monohydric alcohol having 1–30 oxypropylene groups.

3. A composition according to claim 1, wherein the dimeric acid results from the dimerisation of at least one unsaturated fatty acid that contains 18 carbon atoms.

4. A composition according to claim 2, wherein the dimeric acid results from the dimerization of C$_{18}$ unsaturated fatty acids, the dihydroxyl compound is a polypropylene glycol having a molecular weight of approximately 130 to 1,800 and the monohydroxyl compound is selected from the group consisting of (a) a monohydroxyl polyether of condensation of 1,2-propylene oxide on an aliphatic monohydric alcohol having 13 to 15 carbon atoms, which contains about 20 1,2-propylene oxide units per molecule, and (a) an aliphatic monohydric alcohol of 9–11 carbon atoms.

5. A composition according to claim 4, wherein said monohydroxyl compound consists essentially of said monohydroxyl polyether.

6. A composition according to claim 1, wherein the hydrocarbon oil is selected from solvent-refined or acid-refined mineral oils and hydrorefined mineral oils, which have a viscosity at 37.8° C of about 100 to 600 SSU.

7. A composition according to claim 1, wherein the hydrocarbon oil is selected from olefin polymers and mono- or polyalkylated aromatic compounds, which may be at least partially hydrogenated.

8. A composition according to claim 1, wherein said monogenous mixture essentially contains from 80 to 95% by weight of hydrocarbon oil and from 5 to 20% by weight of complex ester composition.

9. A composition according to claim 1, wherein said homogeneous mixture contains from 10 to 40% by weight of light ester, from 50 to 80% by weight of hydrocarbon oil and from 1 to 40% by weight of complex ester composition.

10. The improved lubricating composition according to claim 1, wherein said viscosity index improver is added in an amount sufficient to yield a final composition of SAE 20 W 40 rating.

11. The improved lubricating composition according to claim 1, wherein said viscosity index improver is added in an amount sufficient to yield a final composition of SAE 10 W 30 rating.

12. In a lubricating composition usable as multigrade oil for motor-car engines, and comprising a major proportion of base oil of lubricating viscosity and, in amounts sufficient to effect each additives' attendant function, an additive selected from the group consisting of viscosity index improvers, antioxidants, detergents and mixtures thereof, the improvement which comprises utilizing as the base oil a homogeneous mixture comprising:

a. from 50 to 99% by weight of at least one mineral or synthetic hydrocarbon oil of lubricating viscosity, b. from 1 (CH$_2$)$_x$ to 50% by weight of at least one complex ester composition produced by the esterification of a dimeric acid derived from at least one unsaturated fatty acid which contains from 14 to 22 carbon atoms, with at least one dihydroxyl compound selected from polyalkylene glycols having the general formula H—(O—R$_1$—)$_n$OH, in which R$_1$ is a 1,2-alkylene radical and $n$ is a number of from 2 to 50, and diols having the general formula HO — R$_1'$ — OH, in which R$_1'$ is a divalent hydrocarbon radical, and with at least one hydrocarbyl monohydroxyl compound selected from monohydric hydrocarbyl alcohols, monohydric phenols of the formula R$_2$—OH, oxyalkylenated monohydric hydrocarbyl alcohols, and oxyalkylenated monohydric phenols of the formula R$_2$—O(R$_1$-O)$_n$H, wherein R$_2$ is an aliphatic, alicyclic or aromatic monovalent hydrocarbyl radical, and $n'$ is a number of from 1 to 50, the reagents being employed in proportions which substantially correspond to 3 moles of dimeric acid for 2 moles of dihydroxyl compound and 2 moles of monohydroxyl compound, and c. from 0 to 40% by weight of at least one light ester selected from esters of monohydric hydrocarbyl alcohols and hydrocarbyl dicarboxylic acids, esters of polyols and hydrocarbyl monocarboxylic acids, esters of polyoxyalkylenated hydrocarbyl monohydric alcohols of a low degree of condensation and hydrocarbyl monocarboxylic acids, esters of polyoxyalkylenated hydrocarbyl monohydric alcohols of a low degree of condensation and hydrocarbyl dicarboxylic acids, and esters of polyoxalkylene glycols of low molecular weight and hydrocarbyl monocarboxylic acids.

13. A composition according to claim 12, wherein the dihydroxyl compound consists essentially of at least one diol of the general formula HO—R$_1'$—OH and monohydroxyl compound consists essentially of at least one oxypropylenated monohydric alcohol having 1–30 oxypropylene groups.

14. A composition according to claim 13, wherein the dimeric acid results from the dimerization of C$_{18}$ unsaturated fatty acids, the dihydroxyl compound is neopentyl glycol and the monohydroxyl compound is a monohydroxy polyether of condensation of 1,2-propylene oxide on an aliphatic monohydric alcohol having from 13 to 15 carbon atoms, which contains about 20 propylene oxide units per molecule.

15. A composition according to claim 12, wherein the dihydroxyl compound consists essentially of at least one polypropylene glycol having 2–30 oxypropylene groups and the monohydroxyl compound comprises at least one oxypropylenated monohydric alcohol having 1-30 oxypropylene groups.

16. A composition according to claim 12, wherein the dimeric acid results from the dimerization of at least one unsaturated fatty acid that contains 18 carbon atoms.

17. A composition according to claim 12, wherein the hydrocarbon oil is selected from solvent-refined or acid-refined mineral oils and hydrorefined mineral oils, which have a viscosity at 37.8° C of about 100 to 600 SSU.

18. A composition according to claim 12, wherein the hydrocarbon oil is selected from olefin polymers and mono- or polyalkylated aromatic compounds, which may be at least partially hydrogenated.

19. A composition according to claim 12, wherein said homogeneous mixtures essentially contains from 80 to 95% by weight of hydrocarbon oil and from 5 to 20% by weight of complex ester composition.

20. A composition according to claim 12, wherein said homogenous mixture contains from 10 to 40% by weight of light ester, from 50 to 80% by weight of hydrocarbon oil and from 1 to 40% by weight of complex ester composition.

21. The improved lubricating composition according to claim 12, wherein said viscosity index improver is added in an amount sufficient to yield a final composition of SAE 20 W 40 rating.

22. The improved lubricating composition according to claim 12, wherein said viscosity index improver is added in an amount sufficient to yield a final composition of SAE 10 W 30 rating.

23. In a lubricating composition usable as multigrade oil for motor-car engines, and comprising a major proportion of base oil of lubricating viscosity and, in amounts sufficient to effect each additives' attendant function, an additive selected from the group consisting of viscosity index improvers, antioxidants, detergents and mixtures thereof, the improvement which comprises utilizing as the base oil a homogeneous mixture comprising:
  a. from 50 to 99% by weight of at least one mineral or synthetic hydrocarbon oil of lubricating viscosity,
  b. from 1 to 50% by weight of at least one complex ester composition produced by the esterification of a dimeric acid derived from at least one unsaturated fatty acid which contains from 14 to 22 carbon atoms, and at least one monocarboxylic acid having the general formula R′$_2$COOH, in which R′$_2$ is a monovalent hydrocarbon radical with at least one dihydroxyl compound selected from polyalkylene glycols having the general formula H $+$ O—R$_1$$)_n$ OH, in which R$_1$ is a 1,2-alkylene radical and $n$ is a number of from 2 to 50, the reagents being employed in proportions which substantially correspond to 1 mole of dimeric acid and 2 moles of monocarboxylic acid for 2 moles of dihydroxyl compound, and
  c. from 0 to 40% by weight of at least one light ester selected from esters of monohydric hydrocarbyl alcohols and hydrocarbyl dicarboxylic acids, esters of polyols and hydrocarbyl monocarboxylic acids, esters of polyoxyalkylenated hydrocarbyl monohydric alcohols of a low degree of condensation and hydrocarbyl monocarboxylic acids, esters of polyoxyalkylenated hydrocarbyl monohydric alcohols of a low degree of condensation and hydrocarbyl dicarboxylic acids, and esters of polyoxyalkylene glycols of low molecular weight and hydrocarbyl monocarboxylic acids.

24. A composition according to claim 23, wherein the dihydroxyl compound consists essentially of at least one polypropylene glycol having 2-30 oxypropylene groups.

25. A composition according to claim 24, wherein the dimeric acid results from the dimerization of C$_{18}$ unsaturated fatty acids, the dihydroxyl compound is a polypropylene glycol having a molecular weight of from about 130 to 1,800, and the monocarboxylic acid is lauric acid.

26. A composition according to claim 23, wherein the dimeric acid results from the dimerization of at least one saturated fatty acid that contains 18 carbon atoms.

27. A composition according to claim 23, wherein the hydrocarbon oil is selected from solvent-refined or acid-refined mineral oils and hydrorefined mineral oils, which have a viscosity at 37.8° C of about 100 to 600 SSU.

28. A composition according to claim 23, wherein the hydrocarbon oil is selected from olefin polymers and mono- or polyalkylated aromatic compounds, which may be at least partially hydrogenated.

29. A composition according to claim 23, wherein said homogenous mixtures essentially contains from 80 to 95% by weight of hydrocarbon oil and from 5 to 20% by weight of complex ester composition.

30. A composition according to claim 23, wherein said homogenous mixture contains from 10 to 40% by weight of light ester, from 50 to 80% by weight of hydrocarbon oil and from 1 to 40% by weight of complex ester composition.

31. The improved lubricating composition according to claim 23, wherein said viscosity index improver is added in an amount sufficient to yield a final composition of SAE 20 W 40 rating.

32. The improved lubricating composition according to claim 23, wherein said viscosity index improver is added in an amount sufficient to yield a final composition of SAE 10 W 30 rating.

33. In a lubricating composition usable as multigrade oil for motor-car engines, and comprising a major proportion of base oil of lubricating viscosity and, in amounts sufficient to effect each additives' attendant function, an additive selected from the group consisting of viscosity index improvers, antioxidants, detergents and mixtures thereof, the improvement which comprises utilizing as the base oil a homogeneous mixture comprising:
  a. from 50 to 99% by weight of at least one mineral or synthetic hydrocarbon oil of lubricating viscosity,
  b. from 1 to 50% by weight of at least one complex ester composition produced by the esterification of a trimeric acid derived from at least one unsaturated fatty acid which contains from 14 to 22 carbon atoms, with at least one dihydroxyl compound selected from polyalkylene glycols having the general formula H $+$ O — R$_1$$)_n$ OH, in which R$_1$ is a 1,2-alkylene radical and $n$ is a number of from 2 to 50, and diols having the general formula HO — R$_1$′ — OH, in which R$_1$′ is a divalent hydrocarbon radical, and with at least one monohydroxyl compound selected from monohydric hydrocarbyl alcohols, monohydric phenols of the formula R$_2$— OH, in which R$_2$ is an aliphatic, alicyclic or aromatic hydrocarbyl monovalent radical, and oxyalkylenated hydrocarbyl monohydric alcohols or monohydric phenols having the general formula $R_2 - O + R_1 - O)_{\overline{n'}}H$, in which $R_1$ and $R_2$ are as defined above and $n'$ is a number of from 1 to 50, the reagents being employed in proportions which substantially correspond to 2 moles of trimeric acid for 1 mole of dihydroxyl compound and 4 moles of monohydroxyl compound, and c. from 0 to 40% by weight of at least one light ester selected from esters of monohydric hydrocarbyl alcohols and hydrocarbyl dicarboxylic acids, esters of polyols and hydrocarbyl monocarboxylic acids, esters of polyoxyalkylenated hydrocarbyl monohydric alcohols of a low degree of condensation and hydrocarbyl monocarboxylic acids, esters of polyoxyalkylenated hydrocarbyl monohydric alcohols of a low degree of condensation and hydrocarbyl dicarboxylic acids, and esters of polyoxyalkylene glycols of low molecular weight and hydrocarbyl monocarboxylic acids.

34. A composition according to claim 33, wherein the dihydroxyl compound consists essentially of at least one polypropylene glycol having 2-30 oxypropylene groups and the monohydroxyl compound comprises at least one oxypropylenated monohydric alcohol having 1-30 oxypropylene groups.

35. A composition according to claim 33, wherein the trimeric acid results from the trimerization of at least one unsaturated fatty acid which contains 18 carbon atoms.

36. A composition according to claim 34, wherein the trimeric acid results from the trimerization of $C_{18}$ unsaturated fatty acids, the dihydroxyl compound is a polypropylene glycol having a molecular weight of from about 130 to 1,800, and the monohydroxyl compound is a monohydroxy polyether of condensation of 1,2-propylene oxide on an aliphatic monohydric alcohol having from 13 to 15 carbon atoms, which contains about 20 1,2-propylene oxide units per molecule.

37. A composition according to claim 33, wherein the hydrocarbon oil is selected from solvent-refined or acid-refined mineral oils and hydrorefined mineral oils, which have a viscosity at 37.8° C of about 100 to 600 SSU.

38. A composition according to claim 33, wherein the hydrocarbon oil is selected from olefin polymers and mono- or polyalkylated aromatic compounds, which may be at least partially hydrogenated.

39. A composition according to claim 33, wherein said homogenous mixtures essentially contains from 80 to 95% by weight of hydrocarbon oil and from 5 to 20% by weight of complex ester composition.

40. A composition according to claim 33, wherein said homogenous mixture contains from 10 to 40% by weight of light ester, from 50 to 80% by weight of hydrocarbon oil and from 1 to 40% by weight of complex ester composition.

41. The improved lubricating composition according to claim 33, wherein said viscosity index improver is added in an amount sufficient to yield a final composition of SAE 20 W 40 rating.

42. The improved lubricating composition according to claim 33, wherein said viscosity index improver is added in an amount sufficient to yeild a final composition of SAE 10 W 30 rating.

43. In a lubricating composition usable as multigrade oil for motor-car engines, and comprising a major proportion of base oil of lubricating viscosity and, in amounts sufficient to effect each additives' attendant function, an additive selected from the group consisting of viscosity index improvers, antioxidants, detergents and mixtures thereof, the improvement which comprises utilizing as the base oil a homogeneous mixture comprising:

a. from 50 to 99% by weight of at least one mineral or synthetic hydrocarbon oil of lubricating viscosity, b. from 1 to 50% by weight of at least one complex ester composition produced by the esterification of a trimeric acid derived from at least one unsaturated fatty acid which contains from 14 to 22 carbon atoms, and at least one monocarboxylic acid having the general formula $R_2'$ COOH, in which $R_2'$ is a monovalent hydrocarbon radical, with at least one dihydroxyl compound selected from polyalkylene glycols having the general formula $H + O - R_1)_{\overline{n}}$ OH, in which $R_1$ is a 1,2, alkylene radical and $n$ is a number of from 2 to 50, the reagents being employed in proportions which substantially correspond to 1 mole of trimeric acid and 3 moles of monocarboxylic acid for 3 moles of dihydroxyl compound, and c. from 0 to 40% by weight of at least one light ester selected from esters of monohydric hydrocarbyl alcohols and hydrocarbyl dicarboxylic acids, esters of polyols and hydrocarbyl monocarboxylic acids, esters of polyoxyalkylenated hydrocarbyl monohydric alcohols of a low degree of condensation and hydrocarbyl monocarboxylic acids, esters of polyoxyalkylenated hydrocarbyl monohydric alcohols of a low degree of condensation and hydrocarbyl dicarboxylic acids, and esters of polyoxyalkylene glycols of low molecular weight and hydrocarbyl monocarboxylic acids.

44. A composition according to claim 43, characterized in that the dihydroxyl compound consists essentially of at least one polypropylene glycol having 2-30 oxypropylene groups.

45. A composition to claim 44, wherein the trimeric acid results from the trimerization of $C_{18}$ unsaturated fatty acids, the dihydroxyl compound is a polypropylene glycol having a molecular weight of from about 130 to 1,800, and the monocarboxylic acid is lauric acid.

46. A composition according to claim 43 wherein the trimeric acid results from the trimerization of at least one unsaturated fatty acid which contains 18 carbon atoms.

47. A composition according to claim 43, wherein the hydrocarbon oil is selected from solvent-refined or acid-refined mineral oils and hydrorefined mineral oils, which have a viscosity at 37.8° C of about 100 to 600 SSU.

48. A composition according to claim 43, wherein the hydrocarbon oil is selected from olefin polymers and mono- or polyalkylated aromatic compounds, which may be at least partially hydrogenated.

49. A composition according to claim 43, wherein said homogenous mixtures essentially contains from 80 to 95% by weight of hydrocarbon oil and from 5 to 20% by weight of complex ester composition.

50. A composition according to claim 43, wherein said homogenous mixture contains from 10 to 40% by weight of light ester, from 50 to 80% by weight of hydrocarbon oil and from 1 to 40% by weight of complex ester composition.

51. The improved lubricating composition according to claim 43, wherein said viscosity index improver is added in an amount sufficient to yield a final composition of SAE 20 W 40 rating.

52. The improved lubricating composition according to claim 43, wherein said viscosity index improver is added in an amount sufficient to yield a final composition of SAE 10 W 30 rating.

* * * * *